US012603884B2

(12) United States Patent
Baig et al.

(10) Patent No.: US 12,603,884 B2
(45) Date of Patent: Apr. 14, 2026

---

(54) ACCESSING AN ENCRYPTED PLATFORM

(71) Applicant: WhatsApp LLC, Menlo Park, CA (US)

(72) Inventors: Attaullah Baig, Leander, TX (US);
Archis Apte, Sunnyvale, CA (US)

(73) Assignee: WhatsApp LLC, Menlo Park, CA (US)

( * ) Notice: Subject to any disclaimer, the term of this
patent is extended or adjusted under 35
U.S.C. 154(b) by 358 days.

(21) Appl. No.: 17/973,794

(22) Filed: Oct. 26, 2022

(65) Prior Publication Data

US 2024/0146726 A1 May 2, 2024

(51) Int. Cl.
| | |
|---|---|
| *H04L 9/40* | (2022.01) |
| *H04L 51/21* | (2022.01) |
| *H04L 61/5007* | (2022.01) |

(52) U.S. Cl.
CPC .......... *H04L 63/0876* (2013.01); *H04L 51/21*
(2022.05); *H04L 61/5007* (2022.05); *H04L*
*63/0428* (2013.01)

(58) Field of Classification Search
CPC .................................................. H04L 63/0876
See application file for complete search history.

(56) References Cited

U.S. PATENT DOCUMENTS

| | | | | | |
|---|---|---|---|---|---|
| 7,243,138 | B1 * | 7/2007 | Majkut | ............... | G06F 21/6218 |
| | | | | | 709/219 |
| 7,509,495 | B2 * | 3/2009 | Roig | ..................... | H04L 63/083 |
| | | | | | 713/168 |

| | | | | | |
|---|---|---|---|---|---|
| 8,649,768 | B1 * | 2/2014 | Gaddam | ................. | H04M 3/38 |
| | | | | | 455/414.1 |
| 8,763,089 | B2 * | 6/2014 | Qureshi | .............. | H04W 12/062 |
| | | | | | 726/4 |
| 9,148,427 | B2 * | 9/2015 | Lamberton | ......... | H04L 63/0876 |
| 9,578,005 | B2 * | 2/2017 | Lemaster | ................ | H04L 63/08 |
| 10,148,651 | B2 * | 12/2018 | Maurya | ............... | H04L 63/0807 |
| 11,218,511 | B1 * | 1/2022 | Pugalia | ................. | H04L 63/102 |
| 11,750,603 | B2 * | 9/2023 | Holz | ................... | H04L 63/0428 |
| | | | | | 705/14.49 |
| 2002/0138735 | A1 * | 9/2002 | Felt | ....................... | H04L 9/3247 |
| | | | | | 713/176 |
| 2005/0022020 | A1 * | 1/2005 | Fremberg | ........... | H04L 63/1466 |
| | | | | | 726/4 |
| 2005/0273442 | A1 * | 12/2005 | Bennett | ................. | H04L 9/3215 |
| | | | | | 705/67 |
| 2006/0230461 | A1 * | 10/2006 | Hauser | ................... | H04L 63/08 |
| | | | | | 726/27 |
| 2006/0285493 | A1 * | 12/2006 | Manuja | ............... | H04L 65/1079 |
| | | | | | 370/235 |

(Continued)

OTHER PUBLICATIONS

European Search Report for European Patent Application No.
23194728.4, dated Feb. 2, 2024, 6 pages.

*Primary Examiner* — Khang Do
(74) *Attorney, Agent, or Firm* — EVERSHEDS
SUTHERLAND (US) LLP

(57) ABSTRACT

Methods, systems, and storage media for authenticating
access to a messaging platform are disclosed. Exemplary
implementations may: determine an existence of a user
device associated with a network; receive the IP address
associated with the user device; compare the IP address
associated with the user device with historical metadata
associated with the user device; permit access to the mes-
saging platform; and initiate a communication via the mes-
saging platform.

16 Claims, 6 Drawing Sheets

(56) References Cited

U.S. PATENT DOCUMENTS

| | | | | |
|---|---|---|---|---|
| 2010/0205427 A1* | 8/2010 | Bauer | H04L 63/0884 | |
| | | | 713/151 | |
| 2011/0167477 A1* | 7/2011 | Piccirillo | H04L 9/3271 | |
| | | | 726/4 | |
| 2011/0173681 A1* | 7/2011 | Qureshi | H04L 63/0823 | |
| | | | 726/4 | |
| 2012/0198535 A1* | 8/2012 | Oberheide | G06F 21/335 | |
| | | | 726/9 | |
| 2012/0216040 A1* | 8/2012 | Tanamy | H04L 63/102 | |
| | | | 713/170 | |
| 2013/0160083 A1* | 6/2013 | Schrix | G07C 9/00309 | |
| | | | 726/3 | |
| 2014/0050208 A1* | 2/2014 | Annaluru | H04W 8/26 | |
| | | | 370/338 | |
| 2015/0012990 A1* | 1/2015 | Copsey | H04L 47/803 | |
| | | | 726/7 | |
| 2015/0026789 A1 | 1/2015 | Kato | | |
| 2015/0113589 A1* | 4/2015 | Lemaster | H04L 63/20 | |
| | | | 726/1 | |
| 2016/0134594 A1* | 5/2016 | Teo | H04L 63/045 | |
| | | | 713/171 | |
| 2016/0269403 A1* | 9/2016 | Koutenaei | H04L 63/102 | |
| 2016/0381184 A1* | 12/2016 | Small | G06F 16/23 | |
| | | | 709/203 | |
| 2017/0026369 A1* | 1/2017 | Hao | H04L 63/0876 | |
| 2017/0041296 A1* | 2/2017 | Ford | G06F 21/64 | |
| 2017/0063829 A1* | 3/2017 | Raounak | H04W 12/069 | |
| 2017/0264600 A1* | 9/2017 | Froelicher | H04L 63/0823 | |
| 2018/0198830 A1* | 7/2018 | Wallis | H04L 65/1069 | |
| 2018/0332016 A1* | 11/2018 | Pandey | H04L 63/0428 | |
| 2019/0207935 A1* | 7/2019 | Poovappa | H04L 63/123 | |
| 2019/0305955 A1* | 10/2019 | Verma | H04L 9/3247 | |
| 2019/0372767 A1* | 12/2019 | Mahajan | H04L 51/18 | |
| 2020/0021591 A1* | 1/2020 | Hecht | H04L 63/10 | |
| 2020/0082108 A1 | 3/2020 | Griffin | | |
| 2020/0084186 A1* | 3/2020 | Yang | H04L 67/01 | |
| 2020/0412717 A1 | 12/2020 | Puertas Calvo et al. | | |
| 2021/0058396 A1* | 2/2021 | Nathanson | H04W 4/24 | |
| 2021/0150007 A1 | 5/2021 | Franco | | |
| 2021/0400080 A1* | 12/2021 | Kaidi | G06N 5/025 | |
| 2022/0182398 A1* | 6/2022 | St. Pierre | H04L 63/0236 | |
| 2023/0007036 A1* | 1/2023 | D'souza | G06F 21/85 | |
| 2023/0164140 A1* | 5/2023 | Israeli | H04L 63/0807 | |
| | | | 726/9 | |
| 2023/0319052 A1* | 10/2023 | Aguayo | H04L 63/105 | |
| | | | 726/4 | |
| 2023/0328105 A1* | 10/2023 | Xie | H04L 63/1441 | |
| | | | 726/1 | |
| 2023/0385832 A1* | 11/2023 | McCarthy | G06Q 20/405 | |
| 2024/0146726 A1* | 5/2024 | Baig | H04L 63/0876 | |

* cited by examiner

Messaging Platform 202

User Device 204

206
Receive Message Intended For User

Push Notification Asking User Device To Wake
Up And Retrieve Message                    208

Connection Request (results in this IP subnet
getting verified)                          210

Auth Token Updated to add this IP subnet   212

Message Delivered                          214

200

ACCESSING AN ENCRYPTED PLATFORM

TECHNICAL FIELD

The present disclosure generally relates to accessing an encrypted platform, and more particularly to authenticating access to a messaging platform, e.g., with end-to-end encryption.

BACKGROUND

End-to-end encryption may include systems of communication where only the communicating users can read messages shared between them. End-to-end encryption may prevent potential eavesdroppers (e.g., telecom providers, Internet providers, malicious actors, and providers of the communication service) from being able to access the cryptographic keys needed to decrypt the conversation. End-to-end encryption may prevent data being read or modified, other than by the true sender and recipient(s). The messages may be encrypted by a sender, but third parties may not have a means to decrypt them and may store the messages in encrypted form. The recipient(s) may retrieve the encrypted data and decrypt it themselves.

BRIEF SUMMARY

The subject disclosure provides for systems and methods for accessing an encrypted platform. A user is allowed to securely use an encrypted platform (e.g., an end-to-end encrypted messaging platform) without fear that malware and/or an unofficial end-to-end encrypted messaging client might steal their auth key or use a stolen auth key. For example, responses to push notifications may distinguish typical user behavior from that of an attacker, and thus allow attacker connections to be blocked without interrupting victims' use of the encrypted platform.

One aspect of the present disclosure relates to a method for authenticating access to a messaging platform. The method may include determining an existence of a user device associated with a network. The network may include an IP address. The method may include receiving the IP address associated with the user device. The method may include comparing the IP address associated with the user device with historical metadata associated with the user device. The historical metadata may include a previous IP address associated with the user device. The method may include permitting access to the messaging platform. The messaging platform may include end-to-end encryption. The method may include initiating a communication via the messaging platform.

Another aspect of the present disclosure relates to a system configured for authenticating access to a messaging platform. The system may include one or more hardware processors configured by machine-readable instructions. The processor(s) may be configured to determine an existence of a user device associated with a network. The network may include an IP address. The processor(s) may be configured to receive the IP address associated with the user device. The processor(s) may be configured to compare the IP address associated with the user device with historical metadata associated with the user device. The historical metadata may include a previous IP address associated with the user device. The processor(s) may be configured to permit access to the messaging platform. The messaging platform may include end-to-end encryption. The processor(s) may be configured to, in response to comparing the IP address with historical metadata wherein the IP address is previously unknown, transmit a pseudo message to the user device. The processor(s) may be configured to receive a receipt notification of the pseudo message. The processor(s) may be configured to transmit an auth challenge to the user device.

Yet another aspect of the present disclosure relates to a non-transient computer-readable storage medium having instructions embodied thereon, the instructions being executable by one or more processors to perform a method for authenticating access to a messaging platform. The method may include determining an existence of a user device associated with a network. The network may include an IP address. The method may include receiving the IP address associated with the user device. wherein receiving the IP address associated with the user device includes identifying an IP address associated with a computer network being accessed by the user device. The method may include comparing the IP address associated with the user device with historical metadata associated with the user device. The historical metadata may include a previous IP address associated with the user device. The historical metadata associated with the user device may include an auth token containing a list of all verified IP subnets for the user. The method may include, in response to comparing the IP address with historical metadata where the IP address is previously known, determine a match between the IP address and the previous IP address. The method may include permitting access to the messaging platform. The messaging platform may include end-to-end encryption. The method may include initiating a communication via the messaging platform.

Still another aspect of the present disclosure relates to a system configured for authenticating access to a messaging platform. The system may include means for determining an existence of a user device associated with a network. The network may include an IP address. The system may include means for receiving the IP address associated with the user device. The system may include means for comparing the IP address associated with the user device with historical metadata associated with the user device. The historical metadata may include a previous IP address associated with the user device. The system may include means for permitting access to the messaging platform. The messaging platform may include end-to-end encryption. The system may include means for initiating a communication via the messaging platform.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Figure 1:
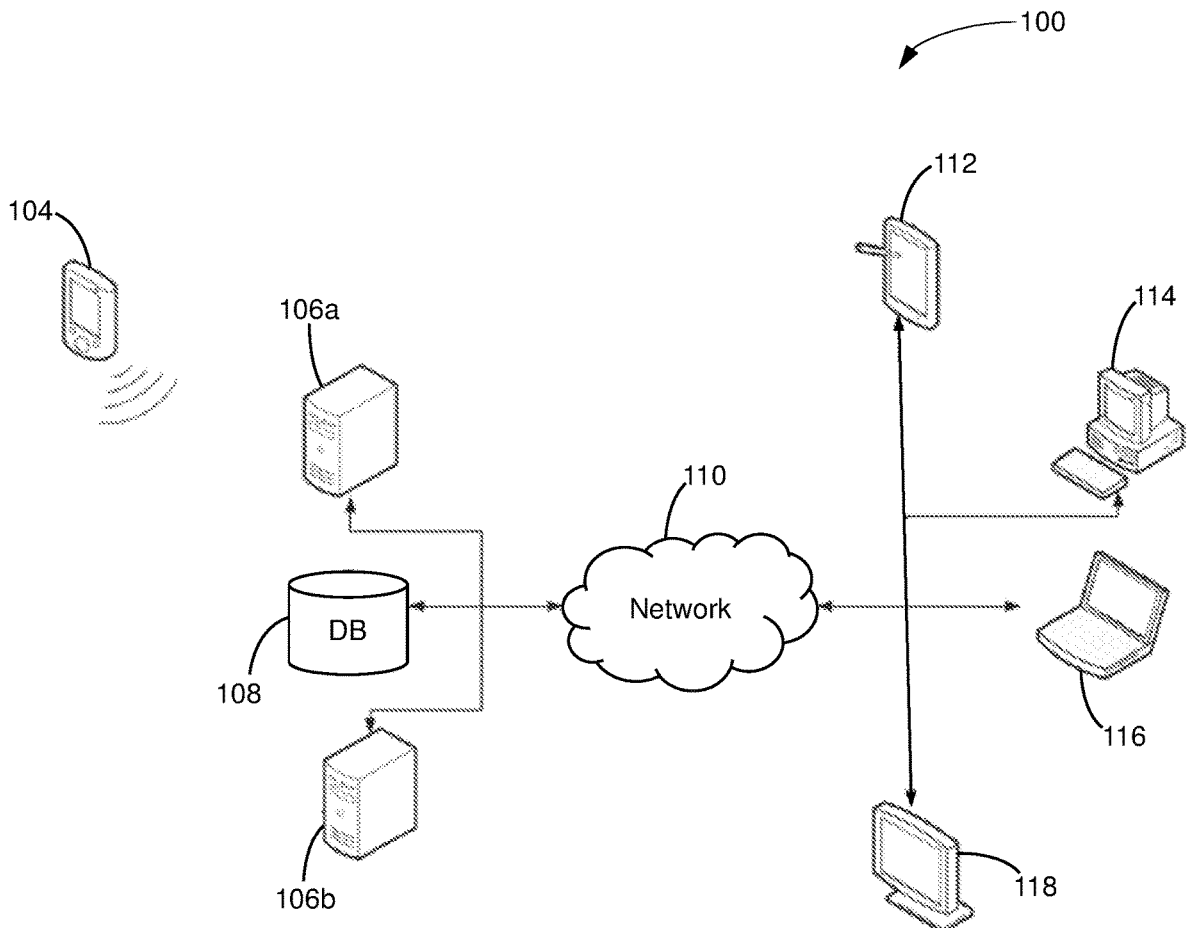
FIG. 1 is a block diagram illustrating an overview of an environment in which some implementations of the disclosed technology can operate.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices. The server computing devices 106a-106b may be configured to show (e.g., make encrypted content visible) content to one or more of the client computing devices for those client computing devices that presented a correct public key. As an example, the server computing devices 106a-106b can include a database (e.g., database 108) that tracks which users of the client computing devices have granted access to their encrypted content (e.g., encrypted by corresponding privately held private keys) to other client users.

In some implementations, the environment 100 may include a server such as an edge server which receives client requests and coordinates fulfillment of those requests through other servers. The server may include the server computing devices 106a-106b, which may logically form a single server. Alternatively, the server computing devices 106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing devices 106a-106b can correspond to a group of servers, and each of these servers can share a database 108 or can have their own database 108. The database 108 may logically form a single unit or may be part of a distributed computing environment encompassing multiple computing devices that are located within their corresponding server, located at the same, or located at geographically disparate physical locations. The database 108 can store data indicative of keys or access granted by a given user to other users of the given user's encrypted content and/or shared messaging platform content that can be subscribed to by other users. The database 108 may also be used to facilitate key rotation in a one-to-many encryption architecture by causing issue of new keys when a copy of a shared key becomes comprised, for example.

The network 110 can be a local area network (LAN), a wide area network (WAN), a mesh network, a hybrid network, or other wired or wireless networks. The network 110 may be the Internet or some other public or private network. Client computing devices can be connected to network 110 through a network interface, such as by wired or wireless communication. The connections can be any kind of local, wide area, wired, or wireless network, including the network 110 or a separate public or private network. In some implementations, the server computing devices 106a-106b can be used as part of a messaging platform such as implemented via the network 110. The messaging platform can host content and protect access to the content, such as via the database 108, although the server computing devices 106a-106b of the messaging platform do not have access to private keys and can be remote/separate from the application(s) that perform key generation and content encryption. The messaging platform can facilitate private communications between users through end-to-end encryption. For example, all messages that pass from one user to another user through the messaging platform may be encrypted. The messages may only be decrypted at user devices of the sending and/or receiving user. A private key required to decrypt the encrypted messages may be stored at the user devices. The messages may contain content items. Content items can be any digital data such as text, images, audio, video, links, webpages, minutia (e.g., indicia provided from a client device such as emotion indicators, status text snippets, location indictors, etc.), or other multi-media.

Some end-to-end encrypted messaging platforms use cryptographic keys for various purposes. For example, an "auth key" may act like a browser cookie and allow an end-to-end encrypted messaging client application to connect to an end-to-end encrypted messaging platform to re-establish a connection without a user having to re-enter credentials (e.g., an SMS code, a password, a PIN, etc.). This mechanism is generally considered secure as these auth keys cannot be stolen during normal usage. However, there may be at least two situations which may allow an auth key to be stolen. In a first situation, the user's mobile device OS may be rooted and allow malware to steal the auth key from the end-to-end encrypted messaging client application. In a second situation, an unofficial end-to-end encrypted messaging client which has access to the auth key may steal the auth key from the user's device. These types of attack may be hard to detect as both the attacker and victim look alike over the network.

The subject disclosure provides for systems and methods for accessing an encrypted platform. A user is allowed to securely use an encrypted platform (e.g., an end-to-end encrypted messaging platform) without fear that malware and/or an unofficial end-to-end encrypted messaging client might steal their auth key or use a stolen auth key. For example, responses to push notifications may distinguish typical user behavior from that of an attacker, and thus allow attacker connections to be blocked without interrupting victims' use of the encrypted platform.

Implementations described herein address the aforementioned shortcomings and other shortcomings by providing a system that detects and prevents these and other types of attacks in real time or near-real time. Some implementations may block an attacker connection, while allowing the victim to use their end-to-end encrypted messaging platform account uninterrupted. Some implementations may consider a typical user behavior in which the user is typically receiving messages in response to a push notification (e.g., from the user's device, a third party, etc.). As soon as the user receives a message on the end-to-end encrypted messaging platform, a push notification may be sent to the user's device asking the device to wake up and retrieve the offline message from the end-to-end encrypted messaging platform. On the other hand, an attacker who has access to the auth key, can only connect to the end-to-end encrypted messaging platform in an old-style web mail fashion. In many cases, the motive of the attacker is to send (i.e., spam, scam, etc.) on behalf of the victim, leveraging the trust that the end-to-end encrypted messaging platform has on the reputation of the victim's account.

Figure 2:
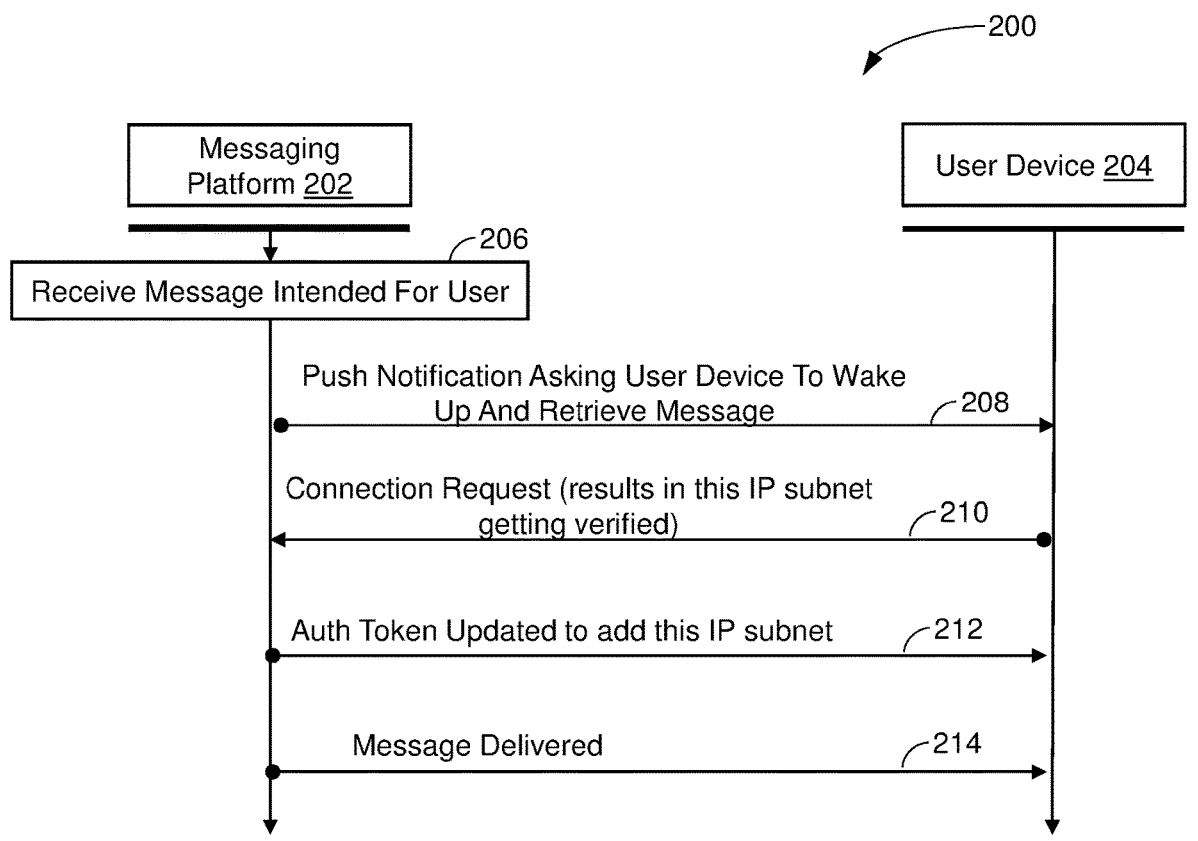
FIG. 2 illustrates an example flow diagram for authenticating access to a messaging platform, in accordance with one or more implementations.
Figure 3:
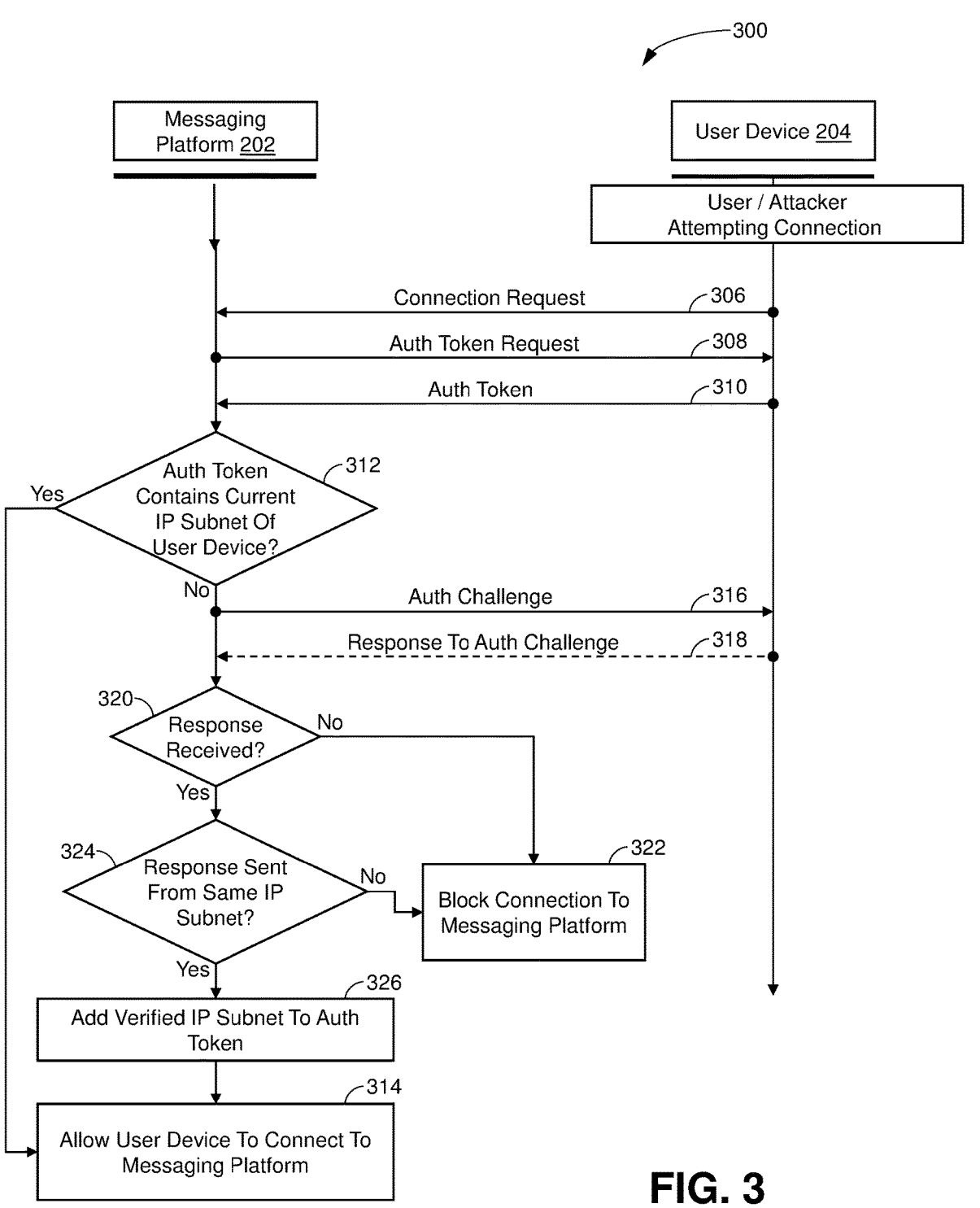
FIG. 3 illustrates an alternate example flow diagram for authenticating access to a messaging platform, in accordance with one or more implementations.

FIGS. 2-3 illustrates an example flow diagrams (e.g., processes 200 and 300) for authenticating access between a messaging platform 202 and a user device 204, in accordance with one or more implementations. For example, the user may receive a message from the platform when the user is offline as depicted in FIG. 2 or the user/attacker may be attempting to access the messaging platform as depicted in FIG. 3. The messaging platform 202 may be an end-to-end encrypted messaging platform. The user device 204 may at first be associated with an authorized users, e.g., through an end-to-end encrypted messaging application; however, the user device 204 may actually be associated with either the authorized user or an attacker user ("attacker").

In FIG. 2, the messaging protocol may be attempting to authenticate and connect with a user who is offline. At step 206, the messaging platform 202 may receive a message (e.g., an encrypted message) that is intended for the authorized user. At step 208, the messaging platform 202 may send a push notification to the user device 204. The push notification may ask the user device 204 to wake up and retrieve the message. A push notification (e.g., a push nonce) may be used to identify if the user device 204 is connecting in response to a push notification from the messaging platform 202. At step 210, the user device 204 can generate and send a connection request to the messaging platform 202. During this step the IP subnet can be verified. In step 212, the authorization token can be updated to the IP subnet. In Step 214, the message can be transmitted from the messaging platform 202 to the user device 204.

In FIG. 3, the user/attacker may be attempting to access the social media platform to read or send a message. At step 306, the messaging platform 202 may receive a connection request sent by the user device 204. At step 2308, the messaging platform 202 may send an auth token request to the user device 204. An auth-token (equivalent to a context bound cookie). It contains a list of all verified IP subnets for the user. At step 310, the messaging platform 202 may receive an auth token sent by the user device 204. At step 312, the messaging platform 202 may determine whether the auth token contains a current IP subnet of the user device 204. If so, at step 314, the messaging platform 202 may allow the user device 204 to connect to the messaging platform 202 (e.g., to retrieve the message).

If the current IP subnet of the user device 204 is not found in the auth token, at step 316, the messaging platform 202 may send an auth challenge to the user device 204. An auth-challenge (used to challenge a new client connection coming from an unverified IP). The auth challenge may include an active invisible push notification containing the IP subnet of the connection which is being challenged. At step 318, the messaging platform 202 may or may not receive a response to the auth challenge sent by the user device 204. At step 320, the messaging platform 202 may determine whether a response to the auth challenge was received. If no response is received after a threshold duration, the auth challenge may be resent one or more times. If, ultimately, no response to the auth challenge is received, at step 322, the messaging platform 202 may block the connection between the messaging platform 202 and the user device 204.

If a response to the auth challenge is received, at step 324, the messaging platform 202 may determine whether the response to the auth challenge was received from the same IP subnet. If the same IP subnet was not determined, at step 322, the messaging platform 202 may block the connection between the messaging platform 202 and the user device 204. If the same IP subnet was found, at step 326, the messaging platform 202 may add the verified IP subnet to the auth token. Once the verified IP subnet is added to the auth token, at step 314, the messaging platform 202 allow the user device 204 to connect to the messaging platform 202 (e.g., to retrieve the message).

The disclosed system(s) address a problem in traditional encrypted platform access techniques tied to computer technology, namely, the technical problem of detecting malware and/or an unofficial end-to-end encrypted messaging client to prevent stealing of a user's auth key (or use of a stolen auth key) from an encrypted platform (e.g., an end-to-end encrypted messaging platform). The disclosed system solves this technical problem by providing a solution also rooted in computer technology, namely, by providing for authenticating access to a messaging platform, e.g., with end-to-end encryption. The disclosed subject technology further provides improvements to the functioning of the computer itself because it improves processing and efficiency in accessing an encrypted platform.

Figure 4:
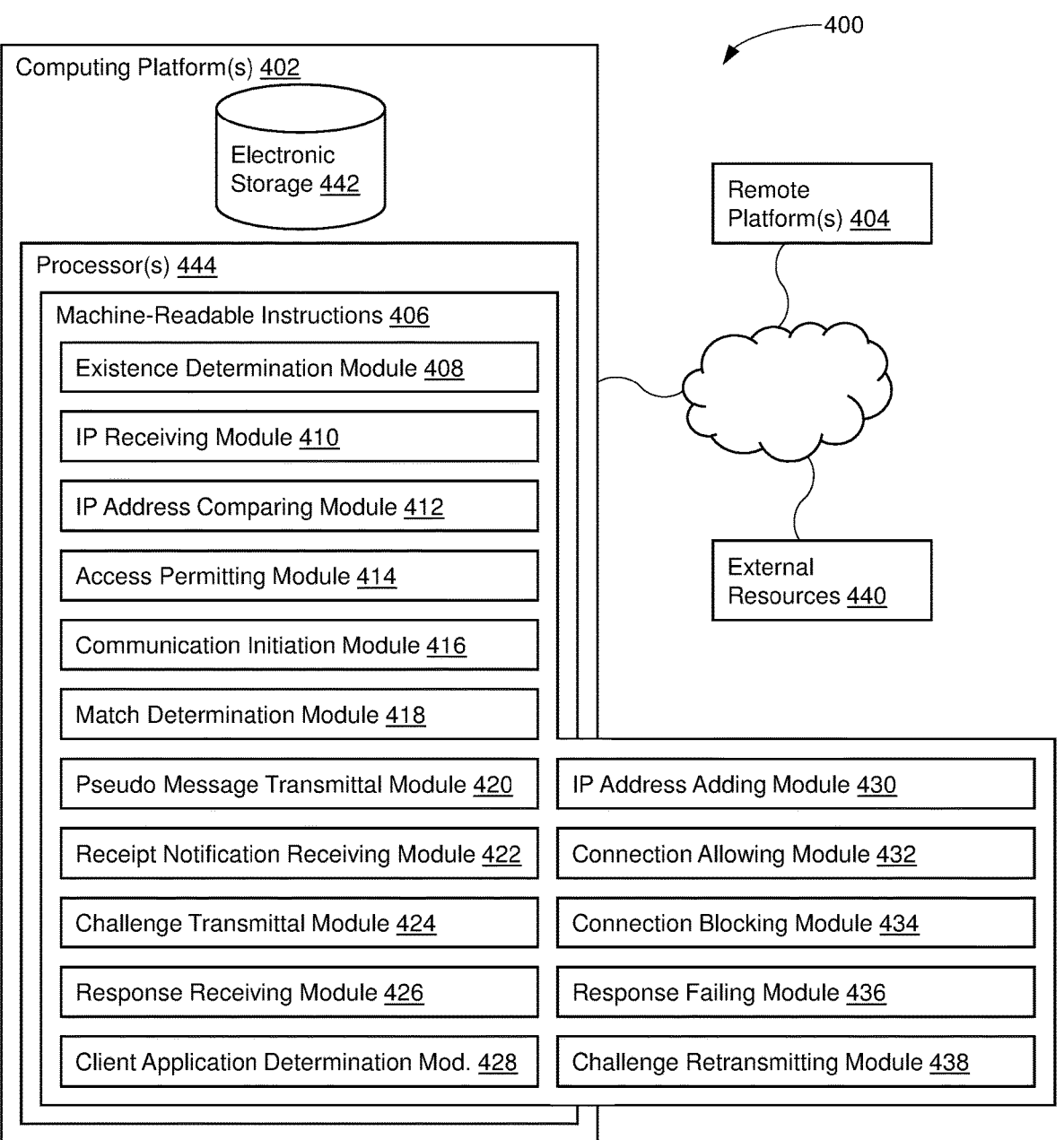
FIG. 4 illustrates a system configured for accessing an encrypted platform, in accordance with one or more implementations.

FIG. 4 illustrates a system 400 configured for accessing an encrypted platform, according to certain aspects of the disclosure. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of existence determination module 408, IP receiving module 410, IP address comparing module 412, access permitting module 414, communication initiation module 416, match determination module 418, pseudo message transmittal module 420, receipt notification receiving module 422, challenge transmittal module 424, response receiving module 426, client application determination module 428, IP address adding module 430, connection allowing module 432, connection blocking module 434, response failing module 436, challenge retransmitting module 438, and/or other instruction modules.

Existence determination module 408 may be configured to determine an existence of a user device associated with a network. The network may include an IP address. The IP address may include a numerical label that is associated with a computer network that uses internet protocol for communication. The IP address may facilitate network interface identification and location addressing. Determining the existence of the user device associated with the network may include determining that the user device is connected to the network.

IP receiving module 410 may be configured to receive the IP address associated with the user device. Receiving the IP address associated with the user device may include identifying an IP address associated with a computer network being accessed by the user device.

IP address comparing module 412 may be configured to compare the IP address associated with the user device with historical metadata associated with the user device. The historical metadata may include a previous IP address associated with the user device. Comparing the IP address with the historical metadata may include determining whether the historical metadata includes an indication that the user device has previously connected from the IP address.

Access permitting module 414 may be configured to permit access to a messaging platform. The messaging platform may include end-to-end encryption. In some implementations, end-to-end encryption may include all communications being private between two parties that are communicating with each other. In some implementations, the messaging platform may be an end-to-end encrypted messaging platform. In some implementations, permitting access to the messaging platform may include allowing a connection between a messaging client application and the messaging client platform.

Communication initiation module 416 may be configured to initiate a communication via the messaging platform. By way of non-limiting example, the communication may include one or more of a text message, an audio message, and/or a video message. Initiating the communication via the messaging platform may include facilitating the user in communicating with other users through the messaging platform.

Match determination module 418 may be configured to, in response to comparing the IP address with historical metadata where the IP address is previously known, determine a match between the IP address and the previous IP address. The historical metadata associated with the user device may include an auth token containing a list of all verified IP subnets for the user. The historical metadata associated with the user device may include a context bound cookie containing a list of all verified IP subnets for the user. Determining the match between the IP address and the previous IP address may include determining that the historical metadata contains an indication of the previous IP address.

Pseudo message transmittal module 420 may be configured to, in response to comparing the IP address with historical metadata wherein the IP address is previously unknown, transmit a pseudo message to the user device. The pseudo message may include a push nonce. Transmitting the pseudo message to the user device may include sending the push nonce as a push notification to determine whether an end-to-end encrypted messaging client application is connecting to the end-to-end encrypted messaging platform in response to the push notification from end-to-end encrypted messaging platform.

Receipt notification receiving module 422 may be configured to receive a receipt notification of the pseudo message. The receipt notification may include an indication that an end-to-end encrypted messaging client application is connecting to the end-to-end encrypted messaging platform in response to the pseudo message from end-to-end encrypted messaging platform. Receiving the receipt notification of the pseudo message may confirm that an end-to-end encrypted messaging client application is connecting to the end-to-end encrypted messaging platform in response to the pseudo message from end-to-end encrypted messaging platform.

Challenge transmittal module 424 may be configured to, in response to comparing the IP address with historical metadata wherein the IP address is previously unknown, transmit an auth challenge to the user device. Response receiving module 426 may be configured to receive a response to the auth challenge.

Client application determination module 428 may be configured to determine the end-to-end encrypted messaging client application is connecting from a same IP address. Client application determination module 428 may be configured to determine the end-to-end encrypted messaging client application is connecting from a different IP address. IP address adding module 430 may be configured to add the IP address to the historical metadata.

Connection allowing module 432 may be configured to allow a connection between the end-to-end encrypted messaging client application and the end-to-end encrypted messaging client platform.

Connection blocking module 434 may be configured to block a connection between the end-to-end encrypted messaging client application and the end-to-end encrypted messaging client platform. Connection blocking module 434 may be configured to, in response to continuing to fail to receive a response to the auth challenge, block a connection between the end-to-end encrypted messaging client application and the end-to-end encrypted messaging client platform.

Response failing module 436 may be configured to determine whether a response to the auth challenge was received within a threshold duration. Challenge retransmitting module 438 may be configured to retransmit the auth challenge to the user device one or more times.

In some implementations, computing platform(s) 402, remote platform(s) 404, and/or external resources 440 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 440 may be operatively linked via some other communication media.

A given remote platform 404 may include one or more processors configured to execute computer program modules. The computer program modules may be configured to enable an expert or user associated with the given remote platform 404 to interface with system 400 and/or external resources 440, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 440 may include sources of information outside of system 400, external entities participating with system 400, and/or other resources. In some implementations, some or all of the functionality attributed herein to external resources 440 may be provided by resources included in system 400.

Computing platform(s) 402 may include electronic storage 442, one or more processors 444, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 442 may comprise non-transitory storage media that electronically stores information. The electronic storage media of electronic storage 442 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 442 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 442 may include one or more virtual storage resources (e.g., cloud storage, a virtual private network, and/or other virtual storage resources). Electronic storage 442 may store software algorithms, information determined by processor(s) 444, information received from computing platform(s) 402, information received from remote platform(s) 404, and/or other information that enables computing platform(s) 402 to function as described herein.

Processor(s) 444 may be configured to provide information processing capabilities in computing platform(s) 402. As such, processor(s) 444 may include one or more of a digital processor, an analog processor, a digital circuit designed to process information, an analog circuit designed to process information, a state machine, and/or other mechanisms for electronically processing information. Although processor(s) 444 is shown in FIG. 4 as a single entity, this is for illustrative purposes only. In some implementations, processor(s) 444 may include a plurality of processing units. These processing units may be physically located within the same device, or processor(s) 444 may represent processing functionality of a plurality of devices operating in coordination. Processor(s) 444 may be configured to execute modules 408, 410, 412, 414, 416, 418, 420, 422, 424, 426, 428, 430, 432, 434, 436, and/or 438, and/or other modules. Processor(s) 444 may be configured to execute modules 408, 410, 412, 414, 416, 418, 420, 422, 424, 426, 428, 430, 432, 434, 436, and/or 438, and/or other modules by software; hardware; firmware; some combination of software, hardware, and/or firmware; and/or other mechanisms for configuring processing capabilities on processor(s) 444. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 410, 412, 414, 416, 418, 420, 422, 424, 426, 428, 430, 432, 434, 436, and/or 438 are illustrated in FIG. 4 as being implemented within a single processing unit, in implementations in which processor(s) 444 includes multiple processing units, one or more of modules 308, 410, 412, 414, 416, 418, 420, 422, 424, 426, 428, 430, 442, 434, 436, and/or 438 may be implemented remotely from the other modules. The description of the functionality provided by the different modules 408, 410, 412, 414, 416, 418, 420, 422, 424, 426, 428, 430, 432, 434, 436, and/or 438 described below is for illustrative purposes, and is not intended to be limiting, as any of modules 408, 410, 412, 414, 416, 418, 420, 422, 424, 426, 428, 430, 432, 434, 436, and/or 438 may provide more or less functionality than is described. For example, one or more of modules 408, 410, 412, 414, 416, 418, 420, 422, 424, 426, 428, 430, 432, 434, 436, and/or 438 may be eliminated, and some or all of its functionality may be provided by other ones of modules 408, 410, 412, 414, 416, 418, 420, 422, 424, 426, 428, 430, 432, 434, 436, and/or 438. As another example, processor(s) 444 may be configured to execute one or more additional modules that may perform some or all of the functionality attributed below to one of modules 408, 410, 412, 414, 416, 418, 420, 422, 424, 426, 428, 430, 432, 434, 436, and/or 438.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
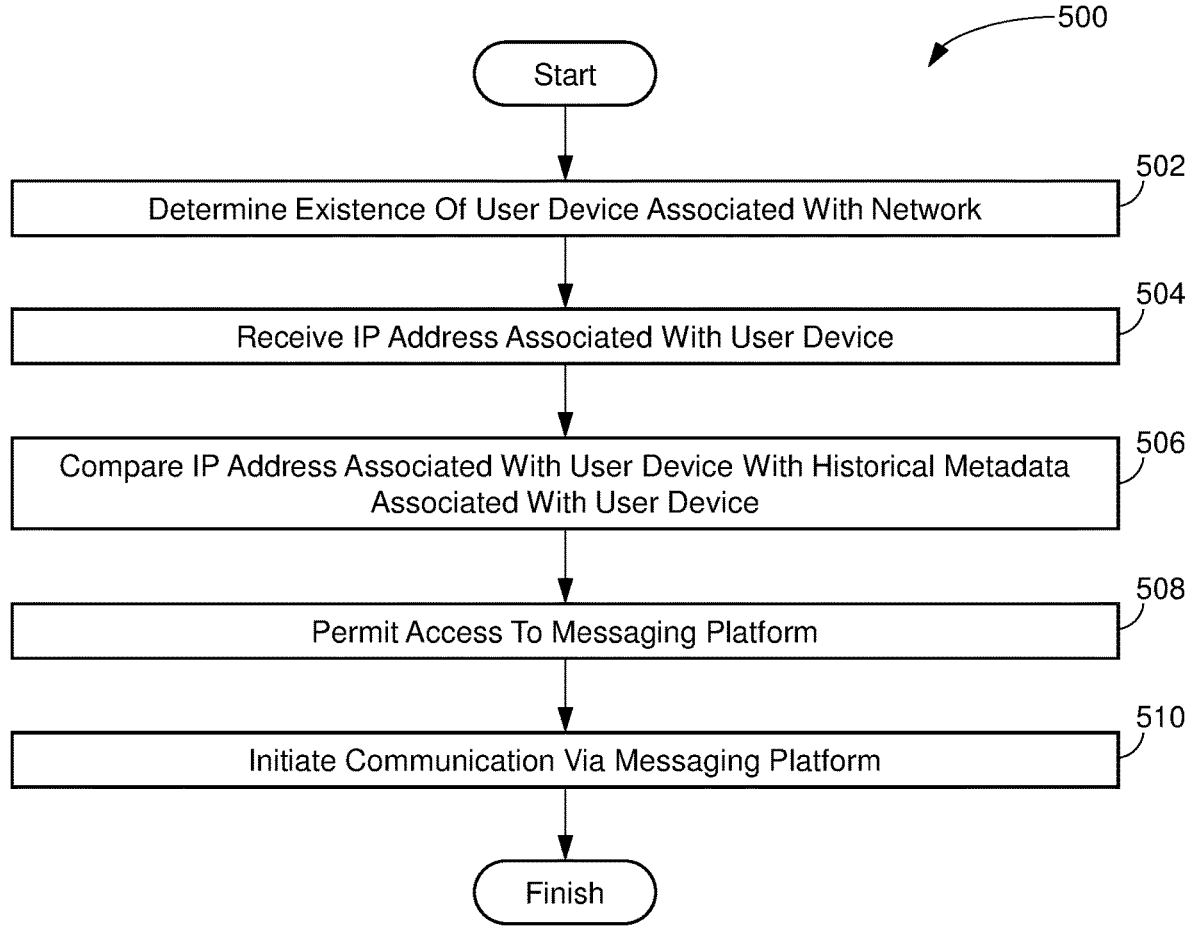
FIG. 5 illustrates an example flow diagram for accessing an encrypted platform, according to certain aspects of the disclosure.

FIG. 5 illustrates an example flow diagram (e.g., process 500) for accessing an encrypted platform, according to certain aspects of the disclosure. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, the process 500 may include determining an existence of a user device associated with a network. The network may include an IP address. At step 504, the process 500 may include receiving the IP address associated with the user device. At step 506, the process 500 may include comparing the IP address associated with the user device with historical metadata associated with the user device. The historical metadata may include a previous IP address associated with the user device. At step 508, the process 500 may include permitting access to the messaging platform. The messaging platform may include end-to-end encryption. At step 510, the process 500 may include initiating a communication via the messaging platform.

For example, as described above in relation to FIG. 5, at step 502, the process 500 may include determining an existence of a user device associated with a network, through existence determination module 408. The network may include an IP address. At step 504, the process 500 may include receiving the IP address associated with the user device, through IP receiving module 410. At step 506, the process 500 may include comparing the IP address associated with the user device with historical metadata associated with the user device, through IP address comparing module 412. The historical metadata may include a previous IP address associated with the user device. At step 508, the process 500 may include permitting access to the messaging platform, through access permitting module 414. The messaging platform may include end-to-end encryption. At step 510, the process 500 may include initiating a communication via the messaging platform, through communication initiation module 416.

According to an aspect, the process 500 may include, in response to comparing the IP address with historical metadata where the IP address is previously known, determining a match between the IP address and the previous IP address.

According to an aspect, the process 500 may include, in response to comparing the IP address with historical metadata wherein the IP address is previously unknown, transmitting a pseudo message to the user device; and receiving a receipt notification of the pseudo message.

According to an aspect, the process 500 may include, in response to comparing the IP address with historical metadata wherein the IP address is previously unknown, transmitting an auth challenge to the user device.

According to an aspect, the process 500 may include receiving a response to the auth challenge; determining the end-to-end encrypted messaging client application is connecting from a same IP address; adding the IP address to the historical metadata; and allowing a connection between the end-to-end encrypted messaging client application and the end-to-end encrypted messaging client platform.

According to an aspect, the process 500 may include receiving a response to the auth challenge; determining the end-to-end encrypted messaging client application is connecting from a different IP address; and blocking a connection between the end-to-end encrypted messaging client application and the end-to-end encrypted messaging client platform.

According to an aspect, the process 500 may include failing to receive a response to the auth challenge after a threshold duration; retransmitting the auth challenge to the user device one or more times; and, in response to continuing to fail to receive a response to the auth challenge, blocking a connection between the end-to-end encrypted messaging client application and the end-to-end encrypted messaging client platform.

According to an aspect, receiving the IP address associated with the user device includes identifying an IP address associated with a computer network being accessed by the user device.

According to an aspect, the historical metadata associated with the user device includes an auth token containing a list of all verified IP subnets for the user.

According to an aspect, the historical metadata associated with the user device includes a context bound cookie containing a list of all verified IP subnets for the user.

Figure 6:
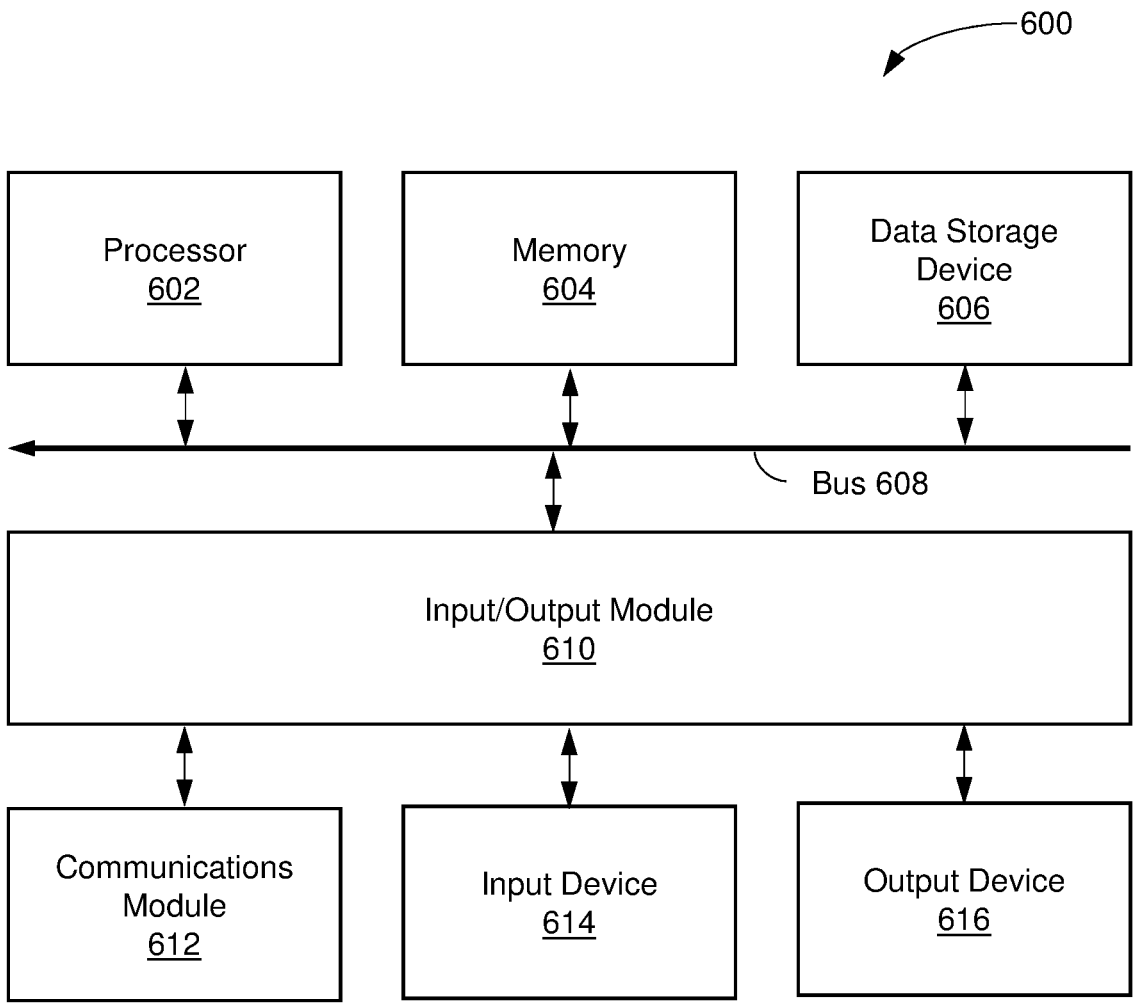
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for authenticating access to a messaging platform, the method comprising:
   determining an existence of a user device associated with a network;
   sending an authorization token request to the user device;
   receiving, from the user device, an authorization token including a first internet protocol (IP) address associated with the user device;
   determining that the first IP address associated with the user device is different than a known IP address associated with the user device;
   in response to determining that the first IP address associated with the user device is different than the known IP address, transmitting an authentication challenge to the user device, wherein the authentication challenge includes an active invisible push notification containing an IP subnet;
   receiving, from the user device and via a second IP address, a response to the authentication challenge; and
   in response to determining that the second IP address is different than the first IP address, preventing access to the messaging platform, the messaging platform comprising end-to-end encryption.

2. The method of claim 1, further comprising:
   in response to determining that the first IP address associated with the user device is different than the known IP address, transmitting a pseudo message to the user device; and
   receiving a receipt notification of the pseudo message.

3. The method of claim 1, further comprising:
   receiving, from the user device and via the first IP address, a response to the authentication challenge; and
   allowing, based on receiving the response to the authentication challenge via the first IP address, a connection between an end-to-end encrypted messaging client application of the user device and the messaging platform.

4. The method of claim 1, further comprising:
   failing to receive a response to the authentication challenge after a threshold duration;
   retransmitting the authentication challenge to the user device one or more times; and
   in response to continuing to fail to receive a response to the authentication challenge, blocking a connection between an end-to-end encrypted messaging client application of the user device and the messaging platform.

5. The method of claim 1, wherein receiving the authorization token associated with the user device includes identifying an IP address associated with a computer network being accessed by the user device.

6. The method of claim 1, wherein the known IP address is identified from the authentication token containing a list of all verified IP subnets for the user device.

7. The method of claim 1, wherein the known IP address is identified from a context bound cookie containing a list of all verified IP subnets for the user device.

8. A system configured for authenticating access to a messaging platform, the system comprising:
   one or more hardware processors configured by machine-readable instructions to:
   determine an existence of a user device associated with a network;
      send an authorization token request to the user device;
      receive, from the user device, an authorization token including a first internet protocol (IP) address associated with the user device;
      determine that the first IP address associated with the user device is different than a known IP address associated with the user device;
      in response to determining that the first IP address associated with the user device is different than the known IP address, transmit an authentication challenge to the user device, wherein the authentication challenge includes an active invisible push notification containing an IP subnet;
      receive, from the user device and via a second IP address, a response to the authentication challenge; and
      in response to determining that the second IP address is different than the first IP address, prevent access to the messaging platform, the messaging platform comprising end-to-end encryption.

9. The system of claim 8, wherein end-to-end encryption includes all communications being private between two parties that are communicating with each other.

10. The system of claim 8, wherein the one or more hardware processors are further configured by machine-readable instructions to:
   transmit a pseudo message to the user device by sending a push nonce as a push notification to determine whether an end-to-end encrypted messaging client application is connecting to the messaging platform in response to the push notification from the messaging platform.

11. The system of claim 10, wherein the one or more hardware processors are further configured by machine-readable instructions to:
   receive a receipt notification that includes an indication that the end-to-end encrypted messaging client application is connecting to the messaging platform in response to the pseudo message from the messaging platform.

12. The system of claim 11, wherein the one or more hardware processors are further configured by machine-readable instructions to:
   receive, from the user device and via the first IP address, a response to the authentication challenge; and
   allow, based on receiving the response to the authentication challenge via the first IP address, a connection between an end-to-end encrypted messaging client application of the user device and the messaging platform.

13. The system of claim 11, wherein the one or more hardware processors are further configured by machine-readable instructions to:
   fail to receive a response to the authentication challenge after a threshold duration;

retransmit the authentication challenge to the user device one or more times; and in response to continuing to fail to receive a response to the authentication challenge, block a connection between the end-to-end encrypted messaging client application and the end-to-end encrypted messaging client platform.

14. The system of claim 8, wherein receiving the authorization token associated with the user device includes identifying an IP address associated with a computer network being accessed by the user device.

15. The system of claim 8, wherein the known IP address is identified from the authentication token containing a list of all verified IP subnets for the user device, or wherein the known IP address is identified from a context bound cookie containing a list of all verified IP subnets for the user device.

16. A non-transient computer-readable storage medium having instructions embodied thereon, the instructions being executable by one or more processors to perform a method for authenticating access to a messaging platform, the method comprising:

determining an existence of a user device associated with a network;

sending an authorization token request to the user device;

receiving, from the user device, an authorization token including a first internet protocol (IP) address associated with the user device;

determining that the first IP address associated with the user device is different than a known IP address associated with the user device;

in response to determining that the first IP address associated with the user device is different than the known IP address, transmitting an authentication challenge to the user device, wherein the authentication challenge includes an active invisible push notification containing an IP subnet;

receiving, from the user device and via a second IP address, a response to the authentication challenge; and in response to determining that the second IP address is different than the first IP address, preventing access to the messaging platform, the messaging platform comprising end-to-end encryption.

\* \* \* \* \*